Sept. 9, 1958 P. DUBILIER 2,851,527
SONIC VIBRATION DETECTION APPARATUS
Filed May 2, 1956

INVENTOR.
Philip Dubilier.
BY
Maxwell E. Sparrow.
ATTORNEY.

United States Patent Office 2,851,527
Patented Sept. 9, 1958

2,851,527

SONIC VIBRATION DETECTION APPARATUS

Philip Dubilier, Long Beach, N. Y.

Application May 2, 1956, Serial No. 582,289

6 Claims. (Cl. 179—1)

This invention relates to sonic vibration detection apparatus in general, and more particularly, to an apparatus for detecting the presence of timing mechanisms in luggage, containers or the like.

A constant menace to all forms of public transportation and one which has been emphasized in the case of air travel is the secretion of explosive devices in the luggage of travelers. Unknown to the journeyer, an explosive device is placed in a suitcase, trunk or other container belonging to the air traveler, and the device is activated by a timing mechanism set for sometime after the plane is airborne. Such activation can result in the demolition of the luggage, vehicle and the occupants thereof. Loss of life from such timed explosive devices has recently been heavy.

Methods have heretofore been devised for detecting so-called time bombs, but on the whole they have not been efficient because they have detected many objects other than explosive devices. A magnetic test, for instance, will locate a large variety of metallic objects other than explosive devices, and will necessitate a search by hand of many pieces of luggage, as almost every test will show a positive result. While hand searchers are effective, they seriously disrupt the quick processing of passengers at an airport and cause passengers inconvenience and embarrassment.

In the normal course of preparation for air travel immediately prior to departure, the major contact with the traveler's luggage by airplane attendants consists of weighing the luggage.

Therefore, the present invention contemplates the detection of explosive devices during the weighing process by means of the amplification of sonic vibrations which usually emanate from timing mechanisms affixed to such devices to activate them. Broadly speaking, this invention contemplates a sonic receiving, amplification and reproduction system combined with a scale, whereby placing objects on the scale activates the system, which will amplify and reproduce the ticking of a time bomb, thus warning passengers and airline attendants. One advantage of a sonic test over other tests is that only time pieces placed in luggage will yield erroneously positive results. Airline instructions to passengers to place their clocks and watches in handbags would eliminate this deceptive result.

Consequently, it is a principal object of this invention to provide an apparatus for detecting explosive devices in luggage by the amplification of sonic vibrations of the timing mechanisms of the devices.

It is another object to provide such a testing apparatus capable of being used in conjunction with a scale adapted to receive luggage.

It is still another object to provide an apparatus for testing luggage for explosive devices, which apparatus will be convenient in use, inconspicuous to the eye, and will yield a minimum of false results.

These and other objects and features of advantage of the present invention will become more apparent from the following detailed description, taken in connection with the accompanying drawings, in which.

Figure 1:
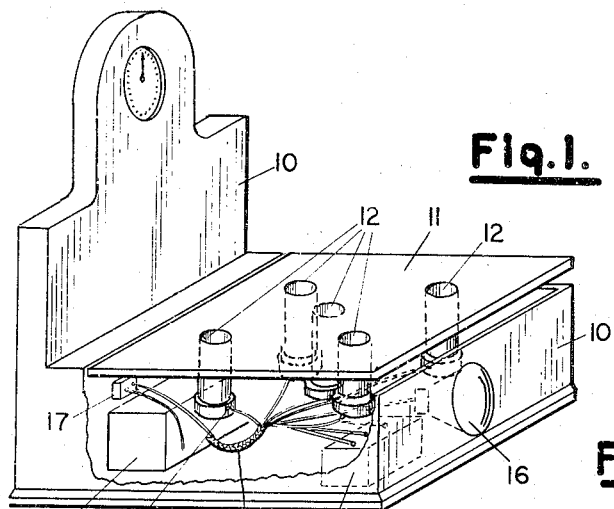
Fig. 1 is a perspective view, partially broken away, of the invention; with details of the scale omitted.
Figure 2:
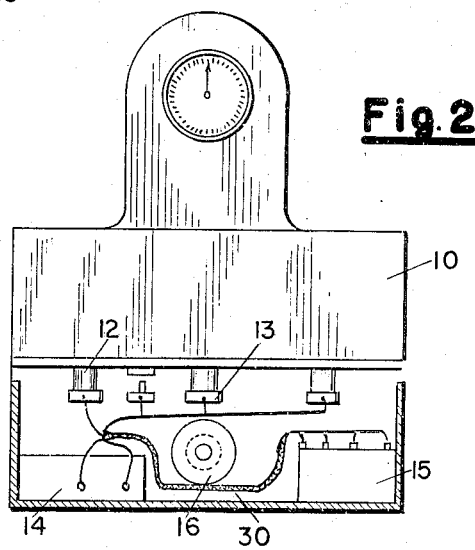
Fig. 2 is a vertical section of the front end of the apparatus of Fig. 1.

As shown in Figs. 1 and 2, a conventional scale frame 10, complete with its own weighing mechanism and indicator dial, houses the apparatus. In the plate 11, which is adapted to have luggage placed upon it, are apertures containing tubes 12, which cooperate with microphones 13. The amplifying apparatus is contained within housing 14, and electric current is supplied to the system by a battery 15, or other source of electric potential by means of cable 30. The amplified sonic vibrations are reproduced by a loudspeaker 16. The entire system is activated upon the closing of the switch 17, which may be so contained within the frame 10 as to be closed only when platform or plate 11 is depressed due to material being placed upon it.

Figure 3:
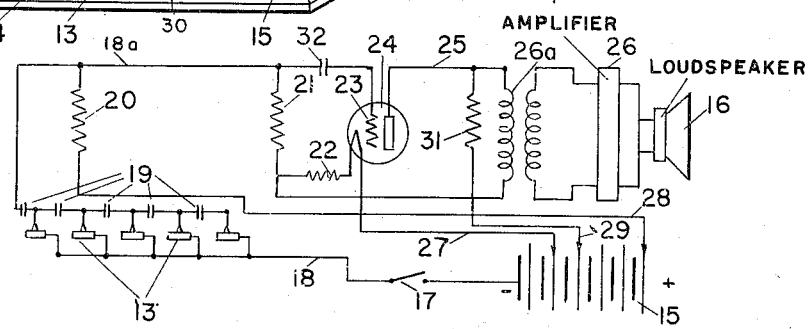
Fig. 3 is a schematic diagram of the amplifying and reproducing system of the invention.

In the schematic diagram of Fig. 3, the battery 15, which has its negative pole grounded, supplies electric current by means of the conductor 18 through the switch 17 to a plurality of microphones 13. Each microphone is connected to the conductor 18, and each microphone is separated from the next adjacent microphone by condensers 19. The sonic vibrations received by the microphones are carried to the grid 23 of the vacuum tube 24. Conductor 25 inductively connects the vacuum tube 24 with a conventional amplifier 26, which in turn is connected to a loudspeaker 16.

Interposed between conductor 18a and conductor 28 (which is connected to battery 15), is a very high resistance 20. Another high resistance 21 has one terminal connected to conductor 18a, its other terminal connecting with resistance 22 and the primary coil 26a of the amplifier unit 26. Resistance 22 is connected to one terminal of the filament of the tube 24, the other terminal of the filament being connected to battery 15 through conductor 27. The other terminal of the primary coil 26a of the amplifier unit 26 is connected to the plate of tube 24 through conductor 25. One terminal of high resistance 31 is connected to conductor 25 and its other terminal is connected to battery 15 through conductor 29. A condenser 32 may be interposed in the line 18a.

In operation, luggage placed on plate or platform 11 depresses the latter to close switch 17, which completes the circuit and causes slight sonic vibrations to be received by microphones 13 and transmitted through vacuum tube 24 to amplifier 26 and loudspeaker 16. Thus an apparatus has been provided which will not be immediately apparent to a passenger placing his luggage on the scale, but which will receive, amplify and reproduce any sonic vibrations, such as the ticking of a timing mechanism within the luggage, and thus result in the saving of life and property.

It will be readily apparent that certain substitutions of components and changes may be made in the various parts of this invention without departing from the spirit thereof. For examples, in place of the loudspeaker may be substituted earphones or devices for mechanically recording sound waves. The latter would have the advantage of not alarming passengers when sonic vibration had been detected; the amplifier can be externally disposed with the speaker or may be located under the platform; the system need not have the switch on the platform, but the switch, if preferable, may be located remote from the scale, that is, the switch may be in the platform in proximity thereto or remote therefrom; the amplifier-loudspeaker or the alarm may be in the scale, in proximity thereto or remote therefrom, such as near the attendant or clerk or in the wall of the building; either one or a multiple of microphones may be provided, one for each tube or one for all of the tubes used; the amplifier may be located in the platform, or about or remote from the scale. Accordingly, the above described embodiment is merely illustrative of the invention for the purposes of this description, and the invention is to be limited only by the scope of the appended claims.

It is apparent that public warning that a detector device of the character described is in operation will be of great benefit in deterring saboteurs and evil characters bent on destruction.

What I claim is:

1. Apparatus of the class described comprising, in combination, means for weighing materials, means for detecting sonic vibrations in said materials when said materials are weighed by said weighing means, and means cooperating with said weighing means for activating said detecting means responsive to the presence of material being weighed on said first-named means.

2. Apparatus as set forth in claim 1 in which said detecting means comprises means for amplifying said vibrations, means for receiving said vibrations and means for reproducing said vibrations.

3. Apparatus of the class described comprising, in combination, means for weighing materials, a material-receiving surface as part of said weighing means, said surface containing apertures, means for receiving sonic vibrations through said apertures, means for amplifying said vibrations and means for reproducing said vibrations, whereby sonic vibrations in materials placed on said receiving surface will be amplified and reproduced.

4. Apparatus of the class described comprising, in combination, means for weighing materials, a material-receiving surface as part of said weighing means, said surface containing apertures, microphones respectively located contiguous to said apertures for receiving sonic vibrations, means for amplifying said vibrations and means for reproducing said vibrations, whereby sonic vibrations in materials placed on said receiving surface will be amplified and reproduced.

5. Apparatus as set forth in claim 4, said reproducing means being a loudspeaker.

6. The combination with a weighing-scale platform of an electrical sound-receiving device located closely beneath said platform, and a switch for energizing and deenergizing said sound-receiving device and operatively connected to said platform to be actuated and deactuated by the latter in response to the presence and absence, respectively, of material being weighed on said platform, said platform being provided with an upwardly opening aperture, said sound-receiving device including a microphone located contiguous to said aperture for receiving sound through said aperture.

References Cited in the file of this patent

UNITED STATES PATENTS

| | | |
|---|---|---|
| 1,924,652 | Rivas | Aug. 29, 1933 |
| 2,486,984 | Rowe | Nov. 1, 1949 |
| 2,554,834 | Lavery | May 29, 1951 |